United States Patent [19]
Kulaszewicz et al.

[11] Patent Number: 5,421,925
[45] Date of Patent: Jun. 6, 1995

[54] WELDED FOAM PANELS

[75] Inventors: Leonard J. Kulaszewicz, Shelby Township, Macomb County; Dale S. Crombez, Utica, both of Mich.

[73] Assignee: Ford Motor Company, Dearborn, Mich.

[21] Appl. No.: 986,307

[22] Filed: Dec. 7, 1992

[51] Int. Cl.$^6$ .............................................. B29C 65/06
[52] U.S. Cl. .................. 156/73.5; 156/580.2
[58] Field of Search ................ 156/73.1, 73.4, 73.5, 156/580.2; 521/130, 174

[56] References Cited

U.S. PATENT DOCUMENTS

| | | | |
|---|---|---|---|
| 4,144,110 | 3/1979 | Luc | 156/73.5 |
| 4,237,181 | 12/1980 | Tanabe et al. | 156/73.1 X |
| 4,524,096 | 6/1985 | Schiedegger et al. | 428/68 |
| 4,770,730 | 9/1988 | Abe | 156/73.1 |
| 5,011,555 | 4/1991 | Sager | 156/73.1 |
| 5,076,870 | 12/1991 | Sanborn | 156/73.1 |
| 5,143,941 | 9/1992 | Rossio et al. | 521/174 X |
| 5,187,204 | 2/1993 | Jackson et al. | 521/174 X |

FOREIGN PATENT DOCUMENTS 0455221 4/1991 European Pat. Off.

OTHER PUBLICATIONS

Leewis, K. G. "Joining Thermoplastic Components by Fusion" Oct. 1989, pp. 1–13.
WPI Abstract Accession Number 84-071863/12 & JP 59026214.
Plastics Engineering vol. 39, No. 6 (Jun. 1983) pp. 27–29 Mock J. A. "Joining large plastic parts? Try vibration welding".

*Primary Examiner*—David A. Simmons
*Assistant Examiner*—J. Sells
*Attorney, Agent, or Firm*—Roger L. May; Damian Porcari

[57] ABSTRACT

The invention is directed to securing rigid foams to a plastic panel through linear welding. The foam is vibrated linearly sufficiently to heat the interface between the foam and panel. The surface of the panel softens and becomes partially molten. The foam is urged into the panel and molten plastic material flows into the foam.

1 Claim, 2 Drawing Sheets

WELDED FOAM PANELS

BACKGROUND OF THE INVENTION

The present invention relates to a method for manufacturing welded foam panels. More specifically, the invention relates to a method for linearly welding a thermoplastic material to a permeable foam material.

It is desirable to use foam materials to provide bulk and crush features to automobiles. Rigid foams have been found to be especially useful in absorbing energy in the event of a collision. Rigid foams have been successfully used as bolsters in the interior of an automobile. Attaching rigid foams to plastic components has generally required the use of adhesives or mechanical fasteners.

U.S. Pat. No. 4,770,730 teaches ultrasonically welding a soft elastomeric foam to a thermoplastic covering. Both the foam and the covering are heated through ultrasonic vertical vibrations until both the foam and covering soften and weld together. U.S. Pat. No. 5,026,445 teaches vibration welding carpeted panels. The patent teaches that carpets made with a thermoplastic material soften and flow in response to frictional heat. The materials will adhere to one another and bond.

U.S. Pat. No. 5,076,870 teaches vibration welding heat fusible nonwoven backing material to a vehicle door trim. This patent teaches fusing the nonwoven material to a fusible panel.

Vibrational welding had generally been limited to welding two similar or compatible materials to the point of softening so that they weld together and bond. Rigid foam materials useful as bolsters generally do not soften under welding.

SUMMARY OF THE INVENTION

The present invention provides a method of producing a foam article comprising the steps of: providing a rigid panel having a mating surface; providing a rigid foam having a mating surface; overlaying the foam atop the panel, the foam mating surface juxtaposed the panel mating surface, and securing the panel to the foam by linear welding, whereby the panel mating surface welds to the foam mating surface.

The invention permits rigid foam bolsters to be linearly welded directly to heat weldable thermoplastic trim panels without the need of adhesives or fasteners. The rigid foam bolsters do not soften during linear welding. A bolster is placed atop a rigid thermoplastic panel. Linear vibrational energy is applied to the bolster. The mating surfaces of the bolster and panel heat due to friction. The thermoplastic panel softens and flows. The bolster is urged against the panel and molten thermoplastic material from the panel mating surface permeates the permeable mating surface of the bolster. The bolster is firmly secured to the panel without the use of adhesive or fasteners. A significant savings in material and weight can be achieved by eliminating adhesives and fasteners.

DETAILED DESCRIPTION OF THE PREFERRED EMBODIMENT

Figure 1:
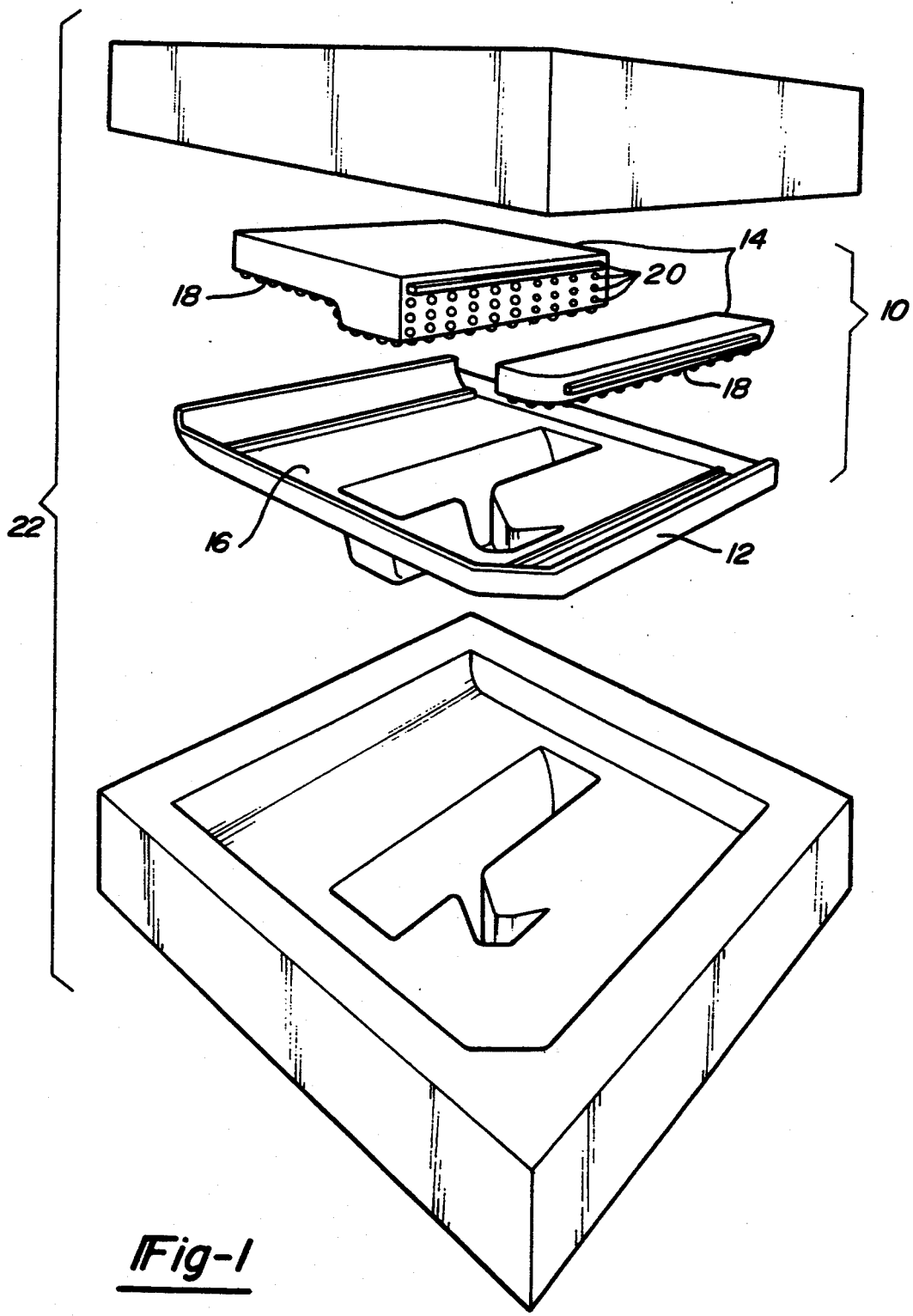
FIG. 1 is an exploded view of the vibration welding tool and foam panel assembly.

Illustrated in FIG. 1 is an exploded view of a apparatus for producing a foam article. The preferred embodiment is described and illustrated as a method of producing an interior vehicle trim panel having a foam bolster. Other articles which fasten rigid foam to a weldable material by linear welding are also possible and within the scope of the present invention. Welding as used herein means molten material from the panel flowing into the permeable surface of the foam. As the molten material cools, it rehardens and becomes firmly secured within the foam. Weldable material means material which becomes soft and flowable when subjected to heat from vibrational energy.

Foam article 10 is a vehicle interior panel including panel 12 and rigid foam 14. Panel 12 is made from a heat weldable thermoplastic which softens and melts under linear welding. Examples of suitable materials include polypropylene, polypropylene wood-pulp blends, ABS, polycarbonate and well as other thermoplastic materials. Rigid foam 14 is secured to panel 12 and acts as a bolster in the event of an impact. Suitable impact absorbing foam are thermoset materials including rigid cross-linked polyurethane, expanded bead polystyrene and partially cross-linked polyolefin. Foams having a destiny of 20 psi or less and are 2 inches or less in thickness are especially preferred and are easily welded to thermoplactic panels.

These foams are rigid and provide a square-wave type crush signature under impact loading. The interior (the non-decorative surface) of panel 12 provides mating surface 16 and is shaped to receive mating surface 18 of foam 14. Surface 16 is caused to heat and soften under vibration welding. The softened material of surface 16 is sufficiently viscus to permeate foam 14. Foam 14 may be open or closed cell, however, at least a portion of the cells on surface 18 are open and permeable to molten material of surface 16.

Figure 2:
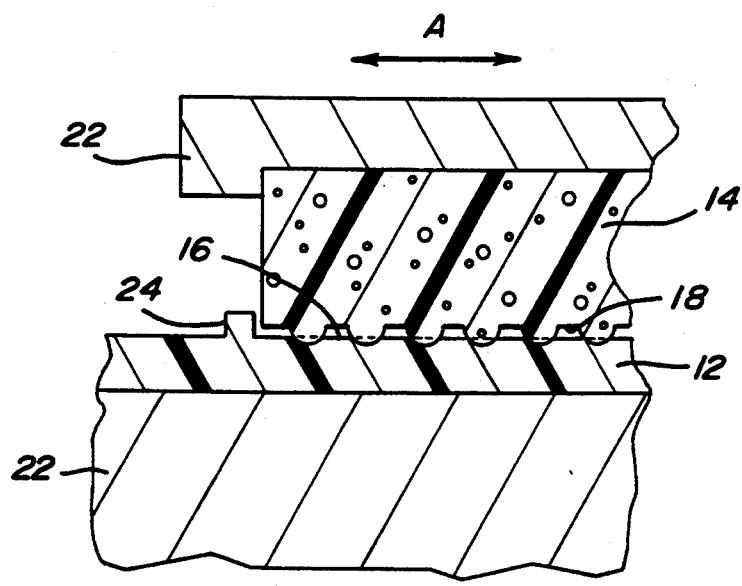
FIG. 2 is a detail sectional view of the tool shown in FIG. 1.
Figure 3:
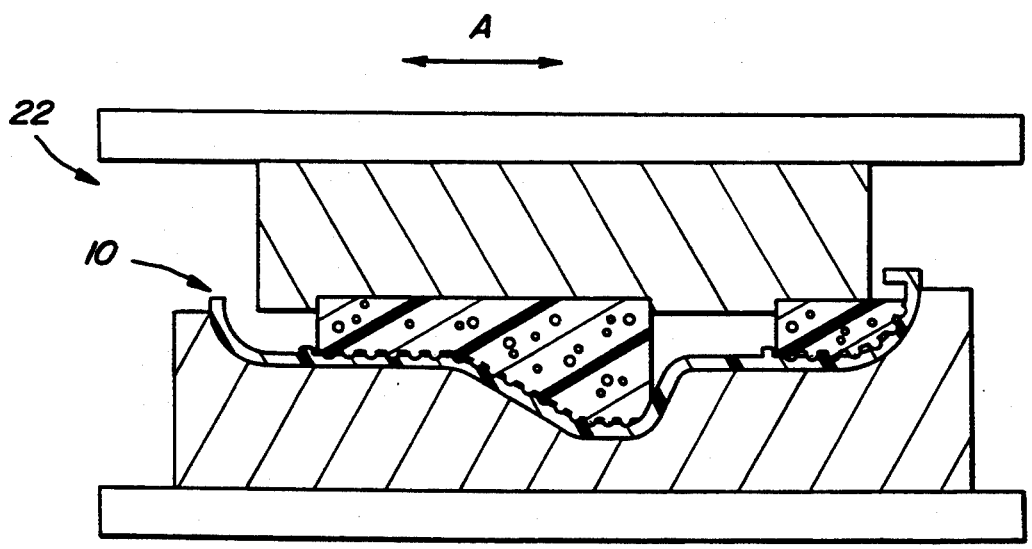
FIG. 3 is a sectional view of the tool shown in FIG. 1.

Energy directors are useful in concentrating vibrational energy in small locations. Energy directors also improve the bond by equalizing the uneven pressure which could result from warped or uneven components. They may be placed either on the foam or the panel. Illustrated in FIGS. 1-3 are energy directors 20 on mating surface 18. Energy directors 20 direct vibrational energy into a concentrated area on surface 16. Directors 20 may consist of elongated ribs or rounded bumps. Use of energy directors permits large surface areas to be linearly welded in a short (20 seconds) cycle time.

Panel 12 is placed within open vibration welding tool 22. Foam 14 is placed atop panel 16 with mating surface 18 juxtaposed surface 16. Tool 22 is operable between an open and closed position and is capable of exerting a clamping pressure of approximately 10 psi to urge foam 14 firmly against panel 12. This clamp pressure is below the crush pressure of the foam. Typical foams crush between 15 and 20 psi. The foam may crush slightly in uneven areas, or the energy directors may crush, but the foam retains sufficient uncrushed capacity to act as a bolster in the event of an impact.

Tool 22 is closed as illustrated in FIGS. 2 and 3. Optionally, positioning means 24 may be added to align foam 14 with respect to panel 12. Use of a positioning means is desirable when using an automated welding system or relatively flat two-dimensional panels. Positioning means 24 may optionally act as energy directors. Linear vibrational energy along the line A is applied through tool 22 to foam 14. Vibrational energy may be applied solely to the foam, the panel or to both. Typical vibrational energies for thermoset foams and polyproplene panels are 240 hertz with an amplitude of 2.0 millimeters for a duration of 20 seconds. The frequency, amplitude and duration of the linear welding is dependent upon the material selected, the amount of clamp pressure and the attaching strength desired. The vibrational energy causes friction between mating surfaces 16, 20 to heat panel 12. Panel 12 softens and becomes viscus and molten material flows into foam 14. As the molten material cools, it rehardens within foam 14. Foam 14 is secured to panel 12 by a mechanical attachment. Foam 14 heats but does not soften or melt. It remains solid or hard through the welding process.

Energy directors 20 are preferably formed with a rounded surface to facilitate linear welding of highly contoured components. At least a portion of the energy director remains in contact with the panel during linear welding. The cross section of an energy director is approximately a 5 to 15 mm radius curved portion that protrudes from the 1 to 4 mm from the surface. The area of energy directors, specific configuration and location are dependant on the choice of materials, geometry and retention required. In general, most types of energy absorbing rigid foams may be attached to thermoplastic materials. Foam release agents may increase the cycle times or reduce retention.

I claim:

1. A method of producing an energy absorbing vehicle interior article comprising the steps of:

providing a rigid foam bolster having permeable energy directors;

overlaying said bolster atop a heat softenable plastic panel, said directors juxtaposed a mating surface on said panel;

applying linear vibrational energy to said directors sufficient to cause said mating surface to heat and soften without softening or melting said bolster or said energy directors;

urging said bolster against said panel and causing said softened mating surface to permeate into said energy directors and said bolster; and cooling said mating surface whereby molten material from said panel flows into and is welded to said bolster.

* * * * *